April 7, 1936.   R. M. RYAN   2,036,983
SYNCHRONIZING SYSTEM
Filed April 30, 1935
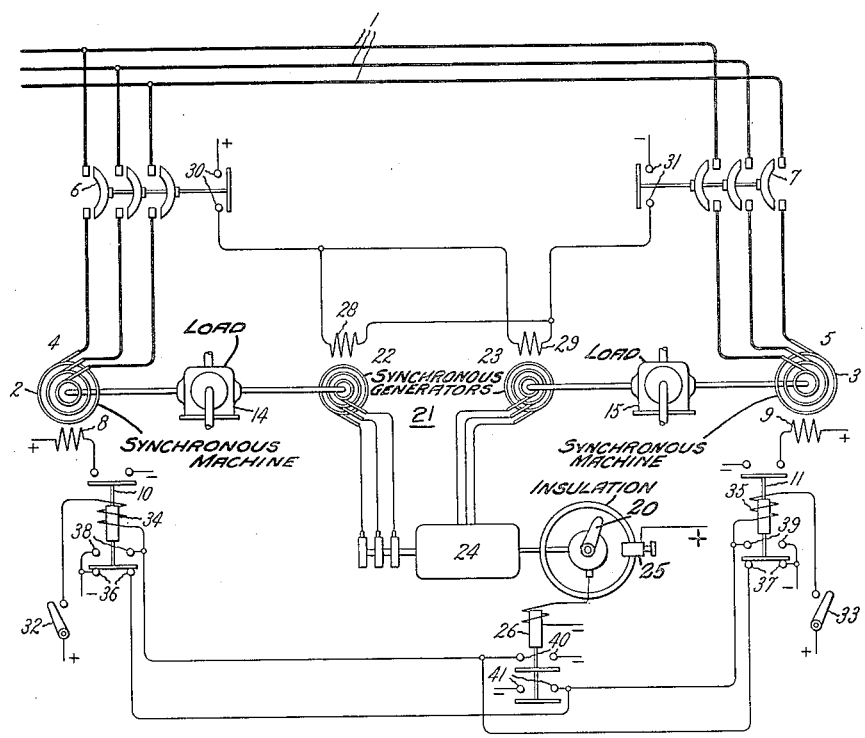
Inventor:
Richard M. Ryan,
by Harry E. Dunham
His Attorney.

Patented Apr. 7, 1936

2,036,983

UNITED STATES PATENT OFFICE 2,036,983

SYNCHRONIZING SYSTEM

Richard M. Ryan, Kansas City, Mo., assignor to General Electric Company, a corporation of New York Application April 30, 1935, Serial No. 19,021

6 Claims. (Cl. 171—118)

My invention relates to synchronizing systems and particularly to a system for synchronizing two parallel connected synchronous machines so that the rotating members driven thereby have a predetermined mechanical angular relation while the machines are operating in synchronism, and one object of my invention is to provide an arrangement for synchronizing two such synchronous machines so that they will have such a predetermined mechanical angular relation between the rotating members driven thereby.

In many alternating current distribution systems, lights and power are connected to the same supply circuit and in such systems, it is essential that the current pulsations, produced by variations in the power load, do not cause light flicker. This is particularly true in cases where the power load includes two or more parallel connected synchronous motors which respectively drive periodically varying loads, such, for example, as compressors, that cause current pulsations of a definite frequency to occur in each motor armature circuit. In accordance with my invention, I provide an arrangement for synchronizing two such synchronous motors so that the current envelope peak of one motor does not coincide with the current envelope peak of the other motor and thereby produce a maximum current envelope peak, but does coincide as nearly as possible with the current envelope valley of the other motor so that the total current supplied to the two motors has a pulsation of double the frequency of the current pulsations produced by one motor and of such a greatly reduced magnitude that it does not produce light flicker.

My invention will be better understood from the following description when taken in connection with the accompanying drawing, the single figure of which diagrammatically illustrates a synchronizing system for two synchronous motors, embodying my invention, and its scope will be pointed out in the appended claims.

In the accompanying drawing, I represents an alternating current supply circuit to which the armature windings 2 and 3 of two synchronous machines 4 and 5 are arranged to be connected by suitable switching means 6 and 7 respectively. The two synchronous machines 4 and 5 are also provided with the field windings 8 and 9 respectively. Suitable field switching means 10 and 11 are provided for respectively connecting the field windings 8 and 9 to a suitable source of excitation. The rotating members of the two machines 4 and 5 are respectively connected in any suitable manner, examples of which are well known in the art, to drive the loads 14 and 15 which are of such a pulsating character that they cause current pulsations of a definite frequency to occur in the armature current of the respective machines.

In order to reduce the resultant current pulsations in the supply circuit 1 so as to reduce to a minimum any light flicker which may be produced thereby, I provide, in accordance with my invention, an arrangement for synchronizing the two machines 4 and 5 so that whenever both of them are operating in synchronism the mechanical angular displacement of the rotating members of the two machines is such that the current pulsations which occur in the armature circuits thereof do not coincide but are displaced so that when the current pulsation in one armature circuit is near its maximum value, the current pulsation in the other armature circuit is near its minimum value. With such an arrangement, the current pulsations in one circuit tend to balance out the other so that the resultant current pulsations in the supply circuit 1 are of a greatly reduced magnitude.

In the particular embodiment of my invention shown in the drawing, the arrangement for synchronizing the two machines 4 and 5 with a predetermined angular relation between the rotating members thereof includes a rotatable contact 20 which is connected to the rotating members of the machines 4 and 5 by a suitable system for the transmission of angular motion 21 which will vary the position of the rotatable contact 20 in accordance with the relative mechanical angular displacement of these rotating members. The particular system for the transmission of angular motion 21 illustrated in the drawing is a well known type which comprises a polyphase generator 22 direct connected to the rotating member of the machine 4, a polyphase generator 23 direct connected to the rotating member of the machine 5, and a dynamoelectric machine 24 having on its stationary member a polyphase winding which is permanently connected electrically to the armature winding of one of the polyphase generators and on its rotatable member, which drives the rotating contact 20, a polyphase winding which is permanently connected electrically to the armature winding of the other polyphase generator. In such a system for the transmission of angular motion, it is well known that when both of the generators 22 and 23 are generating alternating current, the position of the rotor of the dynamo-electric machine 24 varies in accordance with the relative angular positions of the rotors of the generators 22 and 23. Therefore, the position of the rotating contact 20 varies in accordance with the mechanical angular displacement of the rotating members of the machines 4 and 5 to which the rotors of the generators 22 and 23 are directly connected.

Associated with the rotatable contact 20 is a cooperating stationary contact 25, which is so positioned in the path of movement of the rotating contact 20 that it is engaged thereby only during a predetermined portion of the path of movement, at which time there is a predetermined mechanical angular relation between the rotating elements of the machines 4 and 5. Preferably the contact 25 is adjustably mounted so that it can be set at different positions in the path of movement of the rotating contact 20. When the contacts 20 and 25 are in engagement, a circuit is completed for a control relay 26 which, when energized, is arranged to effect the closing of whichever field switching means is then open.

Since there is no need of rotating the contact 20 when only one of the synchronous machines 4 and 5 is in operation, I have shown the field windings 28 and 29 of the generators 22 and 23, respectively, connected in parallel with each other and in series with the contacts 30 and 31, which are respectively closed only when the switching means 6 and 7 are closed.

Associated with the field switching means 10 and 11 are suitable control means which allow the switching means to close only under certain conditions. In actual practice, such control means usually are automatically controlled in response to some speed condition of the associated machine so that its field winding can be excited to pull the machine into synchronism only in case the machine is operating at substantially synchronous speed. However, in order to simplify the disclosure, I have shown these control means as manually controlled switches 32 and 33, which are respectively connected in series with the closing coils 34 and 35 of the switching means 10 and 11. Connected in the circuits for the closing coils of the switching means 10 and 11 are contacts which are controlled by the other switching means so that with both of the switching means 10 and 11 open, either of them can be closed by closing its associated manually controlled switch. For example, the closing of the switch 32, when the switching means 11 is open, completes an energizing circuit for the closing coil 34 of switching means 10 through the auxiliary contacts 37 on the switching means 35. By closing its contacts 38, the switching means 10 completes a locking circuit for its closing coil 34. Similarly, the closing of the control switch 33, when the switching means 10 is open, completes an energizing circuit for the closing coil 35 of switching means 11 through the auxiliary contacts 36 on the switching means 10. By closing its contacts 39, the switching means 11 completes a locking circuit for its closing coil 35. However, when either of the switching means 10 or 11 is closed, the other can be closed only in response to the energization of the relay 26.

The operation of the arrangement shown in the drawing is as follows: When both of the machines 4 and 5 are shut down, either machine can be started by closing its associated switching means. For example, if it is desired to start the machine 4, the switching means 6 is first closed to connect the armature winding 2 to the supply circuit 1 so that the machine accelerates to substantially synchronous speed as an induction motor. Then the switch 32 is closed to complete the above described energizing circuit for the closing coil 34 of the switching means 10 so that the field winding 8 is energized to synchronize the machine 4.

With both machines shut down, the machine 5 may be started in a similar manner by first closing the switching means 7 and then the control switch 33 to effect the closing of the switching means 11 to synchronize the machine 5.

It will now be assumed that while the machine 4 is operating synchronously, the switching means 7 is closed to connect the armature winding 3 of the machine 5 to the supply circuit 1 to cause the machine to accelerate to approximately synchronous speed as an induction motor. Since both of the switching means 6 and 7 are closed, a circuit is completed for the field windings 28 and 29 of the generators 22 and 23 through the closed auxiliary switches 30 and 31. Consequently, the dynamo-electric machine 24 is energized by the two generators 22 and 23 so that the contact 20 rotates at a speed dependent upon the difference in speed between the two machines 4 and 5. During this rotation of the contact 20, its position corresponds at all times to the relative mechanical displacement of the rotating members of the two machines 4 and 5 so that each time these two rotating members occupy a predetermined angular position relative to each other, the movable contact 20 engages the stationary contact 25 and completes an energizing circuit for the control relay 26. While the motor 5 is accelerating during the starting thereof, the closing of the contacts 40 of the relay 26 does not effect the closing of the switching means 11 because the control switch 33 is still open. However, when the machine 5 reaches substantially synchronous speed and the control switch 33 is then closed, the next closure of the contacts 40 of relay 26 completes an energizing circuit for the operating coil 35 of the switching means 11 so that the field winding 9 is energized to pull the machine 5 into synchronism with a predetermined angular displacement between the rotating members of the machines 4 and 5.

From the above description, it will be seen that when the machine 5 is in operation, the machine 4 may be synchronized therewith in a similar manner when the contacts 41 of the relay 26 and the control switch 32 are simultaneously closed.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current circuit, a synchronous machine connected to said circuit, a second synchronous machine having an armature winding and a field winding, a source of direct current excitation for said field winding, means for connecting the armature winding of said second machine to said circuit while said field winding is disconnected from said source, a rotatable contact, a system for the transmission of angular motion interposed between the rotating members of said machines and said rotatable contact to vary the position of said rotatable contact in accordance with the mechanical angular displacement of said rotating members, and means controlled by said rotatable contact for effecting the connection of said field winding to said source of excitation during only a predetermined portion of the range of movement of said rotatable contact.

2. In combination, an alternating current circuit, a synchronous motor connected to said circuit and driving a load of such a character as to produce in said circuit current fluctuation of a predetermined frequency, a second synchronous motor having an armature winding and a field winding and driving a load of such a character as to produce in said circuit current fluctuations similar to said first mentioned current fluctuation, means for connecting the armature winding of said second synchronous motor to said circuit, a source of direct current excitation for said field winding, and means responsive to a predetermined mechanical angular relation of the rotating members of said motors for always effecting the connection of said field winding and said source of excitation so as to synchronize said second motor with said first motor with such mechanical angular relation between the rotating members thereof as to reduce to a minimum the resultant current fluctuations produced in said circuit by both motors.

3. In combination, an alternating current circuit, a synchronous motor connected to said circuit and driving a load of such a character as to produce in said circuit current fluctuation, a second synchronous motor having an armature winding and a field winding and driving a load of such a character as to produce current fluctuations in said circuit, means for connecting said armature winding of said second synchronous motor to said circuit, a source of direct current excitation for said field winding, and means responsive to a predetermined mechanical angular relation of the rotating members of said motors for always effecting the connection of said field winding to said source of excitation so as to synchronize said second motor with said first motor with such a mechanical angular relation between the rotating members thereof that peaks of the two current pulsations do not coincide.

4. In combination, an alternating current circuit, a synchronous motor connected to said circuit and driving a load of such a character as to produce in said circuit current fluctuation, a second synchronous motor having an armature winding and a field winding and driving a load of such a character as to produce current fluctuations in said circuit, means for connecting said armature winding of said second synchronous motor to said circuit, a source of direct current excitation for said field winding, means responsive to a predetermined mechanical angular relation of the rotating members of said motors for always effecting the connection of said field winding to said source of excitation so as to synchronize said second motor with said first motor with such a mechanical angular relation between the rotating members thereof that peaks of the two current pulsations do not coincide comprising a rotatable contact, a system for the transmission of angular motion interposed between the rotating members of said motors and said rotatable contact to vary the position of said rotatable contact in accordance with the mechanical angular displacement of said rotating members, and means controlled by said rotatable contact for effecting the connection of said field winding to said source of excitation during only a predetermined portion of the range of movement of said rotatable contact.

5. In combination, an alternating current circuit, two synchronous machines, each machine including an armature winding and a field winding, switching means individual to each machine for connecting the armature winding thereof to said circuit, a rotatable contact, a system for the transmission of angular motion interposed between the rotating members of said machines and said rotatable contact to vary the position of said rotatable contact in accordance with the relative mechanical angular displacement of said rotating member, means controlled by said switching means for rendering said system for the transmission of angular motion operative when both of said armature windings are simultaneously connected to said circuit, and means controlled by said rotatable contact for effecting the energization of either of said field windings when said rotating contact is in a predetermined portion of its range of movement.

6. In combination, an alternating current circuit, two synchronous machines, each machine including an armature winding and a field winding, switching means individual to each machine for connecting the armature winding thereof to said circuit, a rotatable contact, a system for the transmission of angular motion interposed between the rotating members of said machines and said rotatable contact to vary the position of said rotatable contact in accordance with the relative mechanical angular displacement of said rotating member, means controlled by said switching means for rendering said system for the transmission of angular motion operative when both of said armature windings are simultaneously connected to said circuit, a source of excitation for said field windings, means for effecting the connection of either of said field windings to said source when both are disconnected therefrom, and means controlled by said rotating contact for effecting when one of said field windings is connected thereto the connection of the other field winding to said source in response to a predetermined mechanical angular displacement between the rotating members of said machines.

RICHARD M. RYAN.